United States Patent [19]
Harris

[11] Patent Number: 6,035,680
[45] Date of Patent: *Mar. 14, 2000

[54] COMBINATION KEY LOCK FOR A VEHICLE

[76] Inventor: Betty A. Harris, P.O. Box 17361, Pensacola, Fla. 32522

[*] Notice: Under 35 U.S.C. 154(b), the term of this patent shall be extended for 295 days.

[21] Appl. No.: 08/828,225

[22] Filed: Mar. 13, 1997

Related U.S. Application Data

[63] Continuation of application No. 08/515,387, Aug. 15, 1995, abandoned.

[51] Int. Cl.[7] .................................................. G05B 13/02
[52] U.S. Cl. ................................. 70/427; 70/423; 70/455
[58] Field of Search ..................... 70/DIG. 56, DIG. 57, 70/DIG. 43, 430, 428, 427, 429, 423, 425, 455

[56] References Cited

U.S. PATENT DOCUMENTS

| | | | |
|---|---|---|---|
| 285,074 | 9/1883 | Rhoades et al. | 70/924 |
| 289,446 | 12/1883 | Rhoades et al. | 70/428 |
| 1,464,854 | 8/1923 | Rose | 70/428 |
| 1,590,981 | 5/1926 | Lockyer | 70/428 |
| 2,883,849 | 4/1959 | Lorenzo | 70/427 |
| 3,625,031 | 12/1971 | Alley, III | 70/DIG. 57 |
| 3,635,057 | 1/1972 | Foote et al. | 70/428 |
| 3,866,445 | 2/1975 | Erwin | 70/455 |
| 3,874,204 | 4/1975 | Capri | 70/427 |
| 4,008,589 | 2/1977 | Harrell . | |
| 4,062,193 | 12/1977 | Deleto . | |
| 4,118,961 | 10/1978 | Lee . | |
| 4,134,279 | 1/1979 | Ross et al. . | |
| 4,301,669 | 11/1981 | Floyd | 70/428 |
| 4,304,111 | 12/1981 | Nolin . | |
| 4,438,642 | 3/1984 | De Jong . | |
| 4,462,233 | 7/1984 | Horetzke . | |
| 4,505,140 | 3/1985 | Solow . | |
| 4,732,024 | 3/1988 | Nagy | 70/427 |
| 5,140,843 | 8/1992 | Krueger | 70/429 |

FOREIGN PATENT DOCUMENTS 2158358  5/1973  Germany .

*Primary Examiner*—Darnell M. Boucher
*Attorney, Agent, or Firm*—Richard C. Litman

[57] ABSTRACT

A combination key lock for a vehicle lock cylinder having a keyhole including two flanges, each having a throughbore, integrally disposed on either side of the keyhole. The throughbores receive the shackle of a conventional padlock. The invention also provides for aftermarket reconfiguration of manufacturer-installed lock cylinders.

6 Claims, 2 Drawing Sheets

6,035,680

COMBINATION KEY LOCK FOR A VEHICLE

This application is a continuation of application Ser. No. 08/515,387 filed on Aug. 15, 1995, abandoned.

BACKGROUND OF THE INVENTION

1. Field of the Invention

This invention relates to vehicle security apparatuses. More specifically, the present invention relates to apparatuses which deter unauthorized access to a vehicle ignition.

2. Description of the Prior Art

Nothing is for certain except death and taxes - and crime. Crime profoundly influences our daily lives in many ways. To deter crimes against vehicles, many owners have installed alarm systems in their vehicles. Unfortunately, so many owners have installed alarm systems and so often are these alarm systems erroneously triggered, that piercing signals of burglary now go ignored entirely. Widespread indifference to passive alarm systems creates a need for more positive means for securing against intrusion.

Several types of vehicle locks are described in the literature. Generally, the positive securing apparatuses involve cumbersome equipment requiring some equipment. For example, U.S. Pat. No. 3,635,057, issued Jan. 18, 1972, to Daniel J. Foote et al., describes an auxiliary lock assemblage. The device includes a pair of housings that cooperatively enclose the ignition switch found on the steering column of a vehicle, and define a circular boss. The shackle of a conventional lock circumscribes approximately 180° of the boss. A guide block is snugly received between the lock body and boss. The lock slidingly rotates about the boss.

U.S. Pat. No. 4,008,589, issued Feb. 22, 1977, to Washington Harrell, describes an ignition switch security shield protection against car theft. The apparatus includes a split cylindrical housing having a cavity for receiving the ignition switch. A chain is mounted on one side of the housing. The chain is wrapped around the steering column and locked to the other side of the housing.

U.S. Pat. No. 4,062,193, issued Dec. 13, 1977, to Vincent Deleto, describes a band lock for the ignition of a motor vehicle. The device includes a pair of arcuate arms which encircle the steering column and obstruct the keyhole of the lock cylinder of an ignition switch. The arms are hinged at one end and lockable at the other by means of an integral cylinder lock.

U.S. Pat. No. 4,118,961, issued Oct. 10, 1978, to James D. Lee, describes a protective guard for an ignition switch on a steering column of a motor vehicle. The apparatus includes an open-ended cylindrical housing for receiving an ignition switch. Two cables each having eyes disposed at their respective distal ends extend from opposing sides of the housing. The cables encircle the steering column and are locked by a conventional padlock.

U.S. Pat. No. 4,134,279, issued Jan. 16, 1979, to Steven G. Ross et al., describes a protective safety lock. The device includes a pair of hinged arcuate arms which encircle the steering column. A cavity in one arm receives the ignition switch. A cavity disposed at the end of the other arm provides for receiving and engaging with a lock mechanism at the end of the first arm.

U.S. Pat. No. 4,034,111, issued Dec. 8, 1981, to James F. Nolin, describes a steering wheel cross lock (anti-theft). The apparatus includes an open-ended cylindrical housing for receiving an ignition switch. A first chain encircles the steering column and is locked to the housing with a conventional padlock. A second lock encircles a spoke of the steering wheel and also is locked to the housing with the same padlock.

U.S. Pat. No. 4,438,642, issued Mar. 27, 1984, to Hendrick J. De Jong, describes an attachment device. The device includes a tubular member having a transverse and a longitudinal, shouldered throughbore. A threaded fastener is retained by the shoulder and threadingly engages a threaded target aperture. Once the threaded fastener is engaged with the target aperture, a conventional padlock is received in the transverse throughbore, obstructing access to the threaded fastener.

U.S. Pat. No. 4,462,233, issued Jul. 31, 1984, to John R. Horetzke, describes a detachable guard for keyholes. The apparatus includes two symmetrically flared legs each received in apertures disposed on either side of a lock cylinder. A locking member is slidingly and pivotally mounted between the legs. The locking leg may be rotated from an open position to a closed position and locked thereat.

U.S. Pat. No. 4,505,140, issued Mar. 19, 1985, to Joseph E. Solow, describes an automobile security device for steering column ignition locks. The device includes a housing which receives the ignition switch. A chain mounted in one end of the housing encircles the steering column and is locked to the other side of the housing by conventional padlock.

U.S. Pat. No. 4,732,024, issued Mar. 22, 1988, to David Nagy, describes a door lock with security cylinder and extended key. The apparatus includes a conventional lock cylinder with a tubular boss extending therefrom about a keyhole. The boss has a transverse throughbore for receiving a conventional padlock and obstructing access to the keyhole.

German Patent No. 2,158,358, published May 30, 1973, issued to Joseph Curtin, shows a security device adapted to deter access to a door knob keyhole. The patent shows a frame having a generally oval-shaped cross section. The frame has an open-ended slot disposed in the back, flat side for receiving one side of the stem of a door knob. A plate having an open-ended slot receives the other side of the stem and cooperatively retains the door knob within the frame, obstructing access to the keyhole therein. The frame and plate have coincident throughbores for receiving a conventional padlock.

Clearly, the above demonstrates a need for a combination key lock for a vehicle reliant on cumbersome equipment requiring assembly. A need exists for a lock integral with the extant vehicle ignition switch lock cylinder.

None of the above references, taken alone or in combination, are seen as teaching or suggesting the presently claimed combination key lock for a vehicle.

SUMMARY OF THE INVENTION

The present invention overcomes the limitations of the above inventions by providing a combination key lock for a vehicle such that access to the keyhole of the lock cylinder of a vehicle may be selectably obstructed. The invention includes flanges disposed on either side of the keyhole. Each flange has a throughbore generally aligned with the other. The throughbores receive a conventional padlock.

The invention provides for ready aftermarket conversion of extant ignition switch lock cylinders as well. Replacing the manufacturer-installed lock cylinder with one including the structure herein described, properly secures an ignition system of a vehicle from tampering.

In consideration of the above, an object of the invention is to provide a combination key lock for a vehicle such that access to the keyhole of the lock cylinder of a vehicle may be selectably obstructed.

Another object of the invention is to provide a combination key lock for a vehicle that is readily adaptable for aftermarket conversion of extant ignition switch lock cylinders.

A further object of the invention is to provide a combination key lock for a vehicle that is integral with a vehicle ignition lock cylinder.

An additional object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENT

Figure 1:
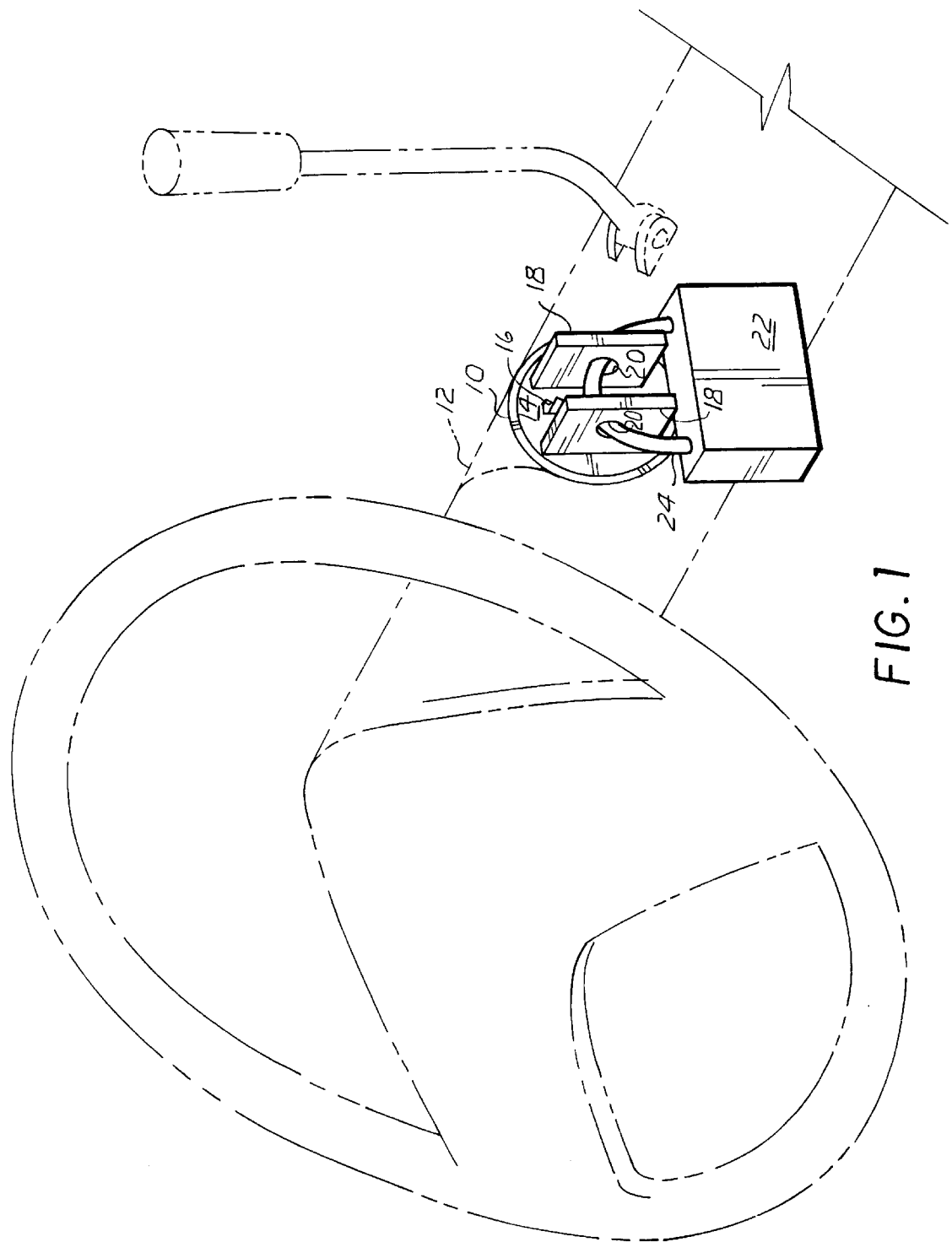
FIG. 1 is an environmental top rear perspective view of the invention installed on a vehicle steering column, the invention shown locked, discouraging access to the keyhole with a key.
Figure 2:
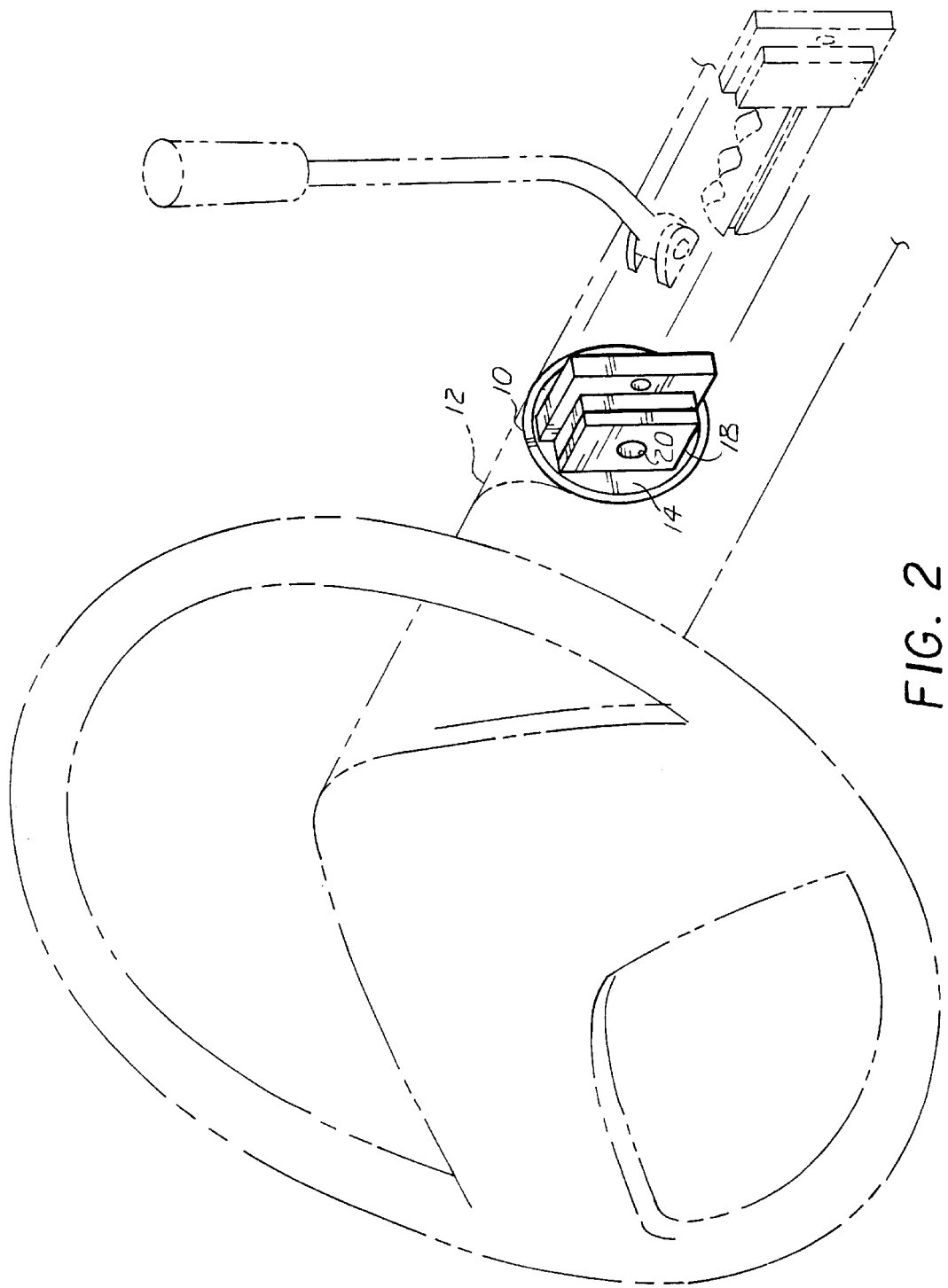
FIG. 2 is an environmental top rear perspective view of the invention installed on a vehicle steering column, the invention shown unlocked, providing access to the keyhole with a key.

Referring to FIGS. 1 and 2, the invention includes a conventional ignition switch lock cylinder 10 shown disposed in a steering column 12. The invention also is suited for use in vehicles having the lock cylinder 10 mounted other than in the steering column 12, such as in the console (not shown). The lock cylinder 10 has a face 14. The keyhole 16 of the lock cylinder 10 is centrally disposed in the face 14. The keyhole 16 has a length greater than its width.

The invention provides two flanges 18 disposed on either side of the keyhole 16. The flanges 18 are shown disposed in generally parallel planes which are also generally parallel to the length of the keyhole 16. The attitude of the flanges 18 is not crucial, however, disposition of throughbores 20 therein is, as is shown below.

Each flange 18 has a throughbore 20 proximate the face 14 of the lock cylinder 10. The throughbores 20 also are disposed near the keyhole 16. Each throughbore 20 is shown generally aligned with the other. The throughbores 20 need not be in registration nor even define a smooth curve. However, the throughbores 20 must provide for receiving a member that extends between the flanges 18 and obstructs access to the keyhole 16.

The invention further provides for employment of a conventional padlock 22. The padlock 22 has a shackle 24 that is received in the throughbores 20. The shackle 24 extends between the flanges 18 and obstructs access to the keyhole 16.

The padlock 22 shown is a conventional key-type lock. A key-type lock is preferred since they are less susceptible to being picked or cracked. The invention is not limited to key-type locks, and may by carried out with a combination-type lock (not shown), cylinder-type lock (not shown) or other known lock means appropriate.

The invention provides for ready aftermarket conversion of extant ignition switch lock cylinders (not shown) as well. The lock cylinder (not shown) of a conventional ignition switch (not shown) as assembled by the manufacturer may be replaced with an improved version thereof which includes the structures described above. Once the old lock cylinder (not shown) is replaced by one having the features of the present invention, the vehicle ignition system is safeguarded against unauthorized tampering.

The present invention is not intended to be limited to the sole embodiment described above, but to encompass any and all embodiments within the scope of the following claims.

I claim:

1. A key lock for a vehicle in combination with an ignition switch lock cylinder having a face and a keyhole therein, the keyhole of the ignition switch lock cylinder having a length greater than its width, the key lock comprising:
    a pair of separate, rectangular planar flanges disposed in parallel planes on opposite sides of the keyhole, each having a throughbore, said flanges permanently secured to the face of said ignition switch lock cylinder and extending parallel to the length of the keyhole; and
    a padlock having a shackle, said shackle received through the throughbores of said flanges, said shackle positioned to prevent unauthorized access to the keyhole of said ignition switch cylinder, said padlock being selected from the group consisting of a key-type lock, a combination-type lock and a cylinder-type lock.

2. The key lock for a vehicle according to claim 1, wherein the padlock is a key-type lock.

3. The key lock for a vehicle according to claim 1, wherein the padlock is a combination-type lock.

4. The key lock for a vehicle according to claim 1, wherein the padlock is a cylinder-type lock.

5. The key lock for a vehicle according to claim 1, wherein the separate parallel flanges have said throughbores which are aligned with each other.

6. The key lock for a vehicle according to claim 1, wherein the separate parallel flanges have said throughbores which define a smooth curve.

* * * * *